United States Patent [19]

Schabert et al.

[11] 3,720,580

[45] March 13, 1973

[54] DEVICE FOR COUPLING NUCLEAR REACTOR CONTROL RODS TO DRIVE LINKAGE THEREFOR AND FOR MAINTAINING CONTROL RODS IN REACTOR CORE

[75] Inventors: Hans-Peter Schabert; Rainer Pawlitzki, both of Erlangen, Germany

[73] Assignee: Siemens Aktiengesellschaft, Berlin and Munich, Germany

[22] Filed: Dec. 5, 1969

[21] Appl. No.: 882,670

[30] Foreign Application Priority Data

Dec. 7, 1968 Germany...................P 18 13 293.9

[52] U.S. Cl. ...............................176/36 R, 176/86 R
[51] Int. Cl. ................................................G21c 7/08
[58] Field of Search............................176/33–36, 86

[56] References Cited

UNITED STATES PATENTS

| 3,079,323 | 2/1963 | Hawke | 176/36 X |
| 3,089,839 | 5/1963 | Hawke et al | 176/36 |
| 3,105,035 | 9/1963 | Weems | 176/81 X |
| 3,321,373 | 5/1967 | Challender | 176/86 X |
| 3,486,974 | 12/1969 | Bertone | 176/36 |

FOREIGN PATENTS OR APPLICATIONS

| 1,435,217 | 3/1966 | France | 176/86 |
| 1,517,953 | 2/1968 | France | 176/36 |

*Primary Examiner*—Carl D. Quarforth
*Assistant Examiner*—Harvey E. Behrend
*Attorney*—Curt M. Avery, Arthur E. Wilfond, Herbert L. Lerner and Daniel J. Tick

[57] ABSTRACT

Method of coupling nuclear reactor control rods, displaceable in guide tubes and around which coolant flows in a nuclear reactor, to a drive linkage therefor, and uncoupling the control rods from the drive linkage includes turning a one-piece drive linkage with respect to a control rod located in reactor shut-off location, and turning the control rod proper with the aid of the drive linkage with respect to a guide tube in which the control rod is received, for the purpose of locking and unlocking the same.

6 Claims, 4 Drawing Figures

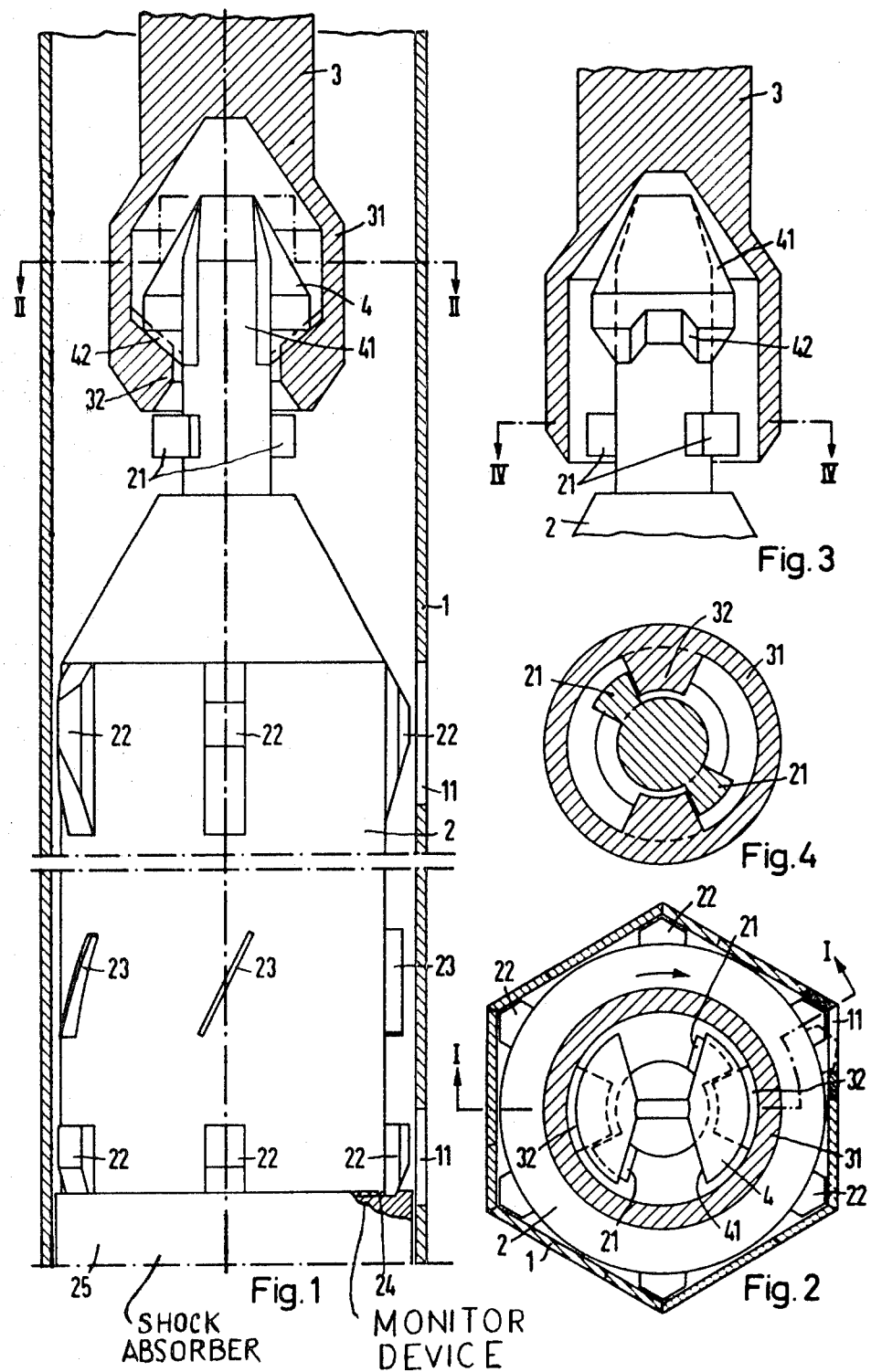

DEVICE FOR COUPLING NUCLEAR REACTOR CONTROL RODS TO DRIVE LINKAGE THEREFOR AND FOR MAINTAINING CONTROL RODS IN REACTOR CORE

Our invention relates to method and device for coupling or uncoupling nuclear reactor control rods to the drive linkage therefor and, more particularly, to such method and device for coupling control rods around which coolant flows and which are displaceable in guide tubes, and especially, for thus coupling control rods of a nuclear reactor cooled by sodium.

A releasable connection or coupling between the control rods of a nuclear reactor and the drive members therefor is absolutely necessary because the control rods proper must remain in the interior of the reactor core for many operations at the nuclear reactor containment vessel, especially when the cover thereof is opened, so that a chain reaction can be safely avoided. A great many different types of construction have already been proposed for such a coupling. They have consisted mostly of clamping or gripping devices, which were actuated from outside the reactor by special linkages in the interior of the drive mechanisms. Such constructions are relatively complex so the problem was presented of finding a construction having the least number of moving parts and offering, moreover, the necessary security against inadvertent removal of the control rod from the reactor core.

It is accordingly an object of our invention to provide method and device for coupling nuclear reactor control rods to drive linkage therefor, which avoid the foregoing disadvantages of the heretofore known methods and devices of this general type.

With the foregoing and other objects in view, we provide, in accordance with our invention, method of coupling nuclear reactor control rods displaceable in guide tubes around which coolant flows, in a nuclear reactor especially cooled with sodium, to a drive linkage therefor, and for uncoupling the control rods from the drive linkage which comprises a one-piece drive linkage with respect to a control rod located in reactor shut-off location and rotating the control rod proper with the aid of the drive linkage, with respect to a guide tube in which the coolant rod is received, for the purpose of locking and unlocking the same.

In accordance with the device of our invention for carrying out the foregoing method, we provide the coupling end of the drive linkage with a bell-like shape and with means for forming a bayonet joint with the head of the control rod. Care is taken that the control rod proper is guided so that it is secure against twisting during its displacement in axial direction in the guide tube therefor, yet can be locked to the guide tube proper in the reactor shut-off position thereof by a slight turning motion. Thereby, an independent upward movement thereof, for example in the case of an unexpected upward flow of Na, is prevented without the drive linkage or rod. Such fixing is desirable, moreover, if a more-or-less caked or jammed-together coupling has to be loosened. Guidance of the control rod in the guide tube proper is achieved by the special cross-sectional shape of the guide tube or by special guiding devices. The cross-sectional shape, determined as a matter of practice from the grid-geometry of the entire reactor cord, i.e., square or hexagonal, for example, inherently prevents turning or twisting when, in accordance with another feature of our invention, control rod of advantageously circular cross section, which is the usual shape of the control rod, is provided with lateral guide cams which travel along the corners of the guide tube. Such a guidance is absolutely necessary during normal displacement of the control rod so that an inadvertent loosening of the connection to the drive linkage is precluded. The drive linkage or rod proper is always prevented from twisting from the driving end thereof during normal operation. The coupling and uncoupling of the drive linkage as well as the locking and unlocking of the control rod with respect to the guide tube therefor is effected only in the reactor shut-off position of the control rods by turning the drive linkage.

Other features which are considered as characteristic for the invention, are set forth in the appended claims.

Although the invention is illustrated and described herein as method and device for coupling nuclear reactor control rods to drive linkage therefor, it is nevertheless not intended to be limited to the details shown, since various modifications may be made therein without departing from the spirit of the invention and within the scope and range of equivalents of the claims.

The invention, however, together with additional objects and advantages thereof, will be best understood from the following description when read in connection with the accompanying drawing, in which:

FIG. 1 is a longitudinal sectional view of a control rod and coupling device according to the invention, taken along the line I—I in FIG. 2;

FIG. 2 is a cross sectional view of FIG. 1 taken along the line II—II;

FIG. 3 is a fragmentary longitudinal sectional view of the upper part of FIG. 1 showing the control rod head and drive linkage in a different phase wherein the control rod is in its lowermost position; and FIG. 4 is a cross sectional view of FIG. 3 taken along the line IV—IV.

Referring now to the drawing, and first particularly to FIG. 1 thereof, it is noted that the longitudinal section therein taken along the line I—I in FIG. 2 passes through a corner of the control rod guide tube in the right-hand side of the figure. Thus, the part of the right-hand side of the center-line in FIG. 1 is therefor wider than that on the left-hand side thereof.

The coupling device illustrated in the figures, is for use in a sodium-cooled nuclear reactor having hexagonal box-shaped fuel elements and hexagonal guide tubes for control rods.

In the hexagonal guide tube 1 there is received a tubular control rod 2 provided with cams 22 (also see FIG. 2) that fit into respective corners of the guide tube 1, so as to render the control rod 2 secure against relative rotation with the guide tube 1. The control rod 2 has a mushroom-shaped head 4 at the upper end thereof to which a drive linkage 3 is coupled, like a bayonet. This drive linkage 3 is provided for this purpose with a bell-like enlargement 31 at the lower end thereof, which is provided with radially inwardly projecting nose pieces 32. The nosepieces 32 are located diametrically opposite one another. Correspondingly, the head 4 of the control 2 is formed with two slots 41 located diametrically opposite one another and having a width and height corresponding to those of the noses 32. To carry out the method of coupling according to our invention, the drive linkage 3, is slid over the control rod head 4 with a rotary angle orientation corresponding to the position of the control rod 2 and is then turned until the noses 32 of the drive linkage 3 engage entrainer embutments 21 provided on the control rod 2. If the drive linkage 3 in this position is then drawn upwardly, the nose pieces 32 of the drive linkage 3 will then be received in recesses 42 formed in the control rod head 4. Relative rotation between the drive linkage 3 and the control rod 2, is thereby no longer possible. In this regard, it is further noted that the drive linkage 3 is guided during its normal movement to the desired positioning of the control rod 2 in the reactor core, secure against twisting of the control rod 2. The devices required therefor, belong to the present state of the art and have, accordingly, not been illustrated or further described in the interest of clarity.

This safety feature which prevents twisting of the control rod 2, is first neutralized when the control rod 2 is in its lowermost or reaction cut-off position, as shown in FIG. 1. In this position, the cams 22 are no longer completely held by the control rod guide tube 1, but rather the latter is formed at the locations of the cams 22 with windows 11 into which the cams 22 can be turned in the direction of the arrow shown in FIG. 2, by turning the entire control rod 2 with the aid of the drive linkage 3 which engages the control rod 2 at the entrainer abutments 21 thereof. This position of the guide cams 22 is shown in dotted lines at the upper right-hand side of FIG. 2. It is furthermore shown in that figure that the nosepieces 32 of the bell 31 of the drive linkage 3 must be twisted to such an extent that the lateral sides thereof abut the entrainer abutments or cams 21. The nosepieces 32 are then located directly below the guide slots 41 formed in the control rod head 4 and, after carrying out the turning of the control rod 2 and the simultaneous locking of the cams 22 thereof in the windows 11 of the control rod guide tube 1, and the drive linkage 3 can then be withdrawn vertically upwardly. The control rod 2 is thereby uncoupled from the drive linkage or rod 3 thereof and is retained in this position fully inserted in the reactor core.

The control rod 2 has reactor coolant continuously flowing around it at every location along the travel path thereof, the coolant being admissible through the lateral windows 11 or through the base of the control rod guide tube 1 that is constructed as a shock absorber and, for this purpose, is formed with non-illustrated bores. By means of flow guide devices 23, for example, in the form of ribs, a force component in peripheral direction of the control rod is formed which tends to hold the control rod 2 always in the locked position. This is the case in normal operation for the drive rod 3 coupled to the control rod 2. The control rod 2 remains there also in the rotary angle position thereof, if the gravity-dependent form lock in the coupling should momentarily be neutralized for an operation wherein the control rod 2 is dropped. The guide tube 1 proper also does not come into frictional engagement with the control rod 2 during such a control rod-dropping operation, and the control rod 2 being held both before and after in the angular position thereof by the drive rod 3. Additional wear due to friction is thus avoided. The flow guide device is advantageous, however, even after uncoupling the drive rod 3. The turning moment developed therefrom excludes any independent unlocking of the control rod 2 from the windows 11 of the guide tube 1. As further security for this case, recesses 24 are formed in the guide tube base 25, the lower guide cams 22 engaging in the recesses 24 in the locking position.

The base 25 of the control rod guide tube 1 can not only be constructed simultaneously as a shock absorber, but can also advantageously contain mechanical or electrical monitoring devices for the final position of the control rod 2, the signals of the monitoring devices being usable for freeing the rotary locking device.

Thereby, in spite of the relative simplicity thereof, according to the requirements of safety technology, a troublefree locked coupling device is provided between control rod and drive rod therefor which offers great advantages precisely in nuclear reactor with sodium as coolant, due to the avoidance of joints of all kinds.

We claim:

1. In combination, in a nuclear reactor, a guide tube traversible by liquid coolant, a nuclear reactor control rod displaceably received in said guide tube, a drive linkage and a device for coupling said nuclear reactor control rod, to said drive linkage and for uncoupling said control rod from said drive linkage comprising a bell-like coupling end formed on said drive linkage, said coupling end being provided with a pair of inwardly projecting nosepieces, a mushroom-shaped head formed on said control rod substantially matching the interior shape of said bell-like coupling end and being provided with at least two longitudinal slots for passing said nosepieces therethrough, said mushroom-shaped head being also formed on the underside thereof with staggered recesses disposed angularly to said underside and comprising stops for said nosepieces, entrainer means extending laterally from said control rod below said head thereof, substantially in a region through which said nosepieces are turnable relative to said control rod, and a plurality of peripherally spaced cams extending laterally from said control rod at at least one axial elevational position thereof, said guide tube being formed with recesses adapted to receive said laterally extending cams therein in a twisted locked position of said control rod when said control rod is in its lowermost position and said drive linkage is rotated to cause said nosepieces to abut said entrainer means and rotate said control rod.

2. The combination according to claim 2, wherein said laterally extending cams are located at the lower end of said control rod.

3. The combination according to claim 2, including flow guide devices formed on said control rod, said guide tube being traversible by reactor coolant so as to apply flow forces to said flow guide devices tending to retain said control rod continuously in said locked position thereof.

4. The combination according to claim 2, including shock absorber means located at said bottom end of the control rod guide tube.

5. The combination according to claim 6, including a monitoring device located at the bottom end of said control rod guide tube for determining the reactor shut-off position of said control rod.

6. In a nuclear reactor, a control rod guide passageway provided in the core of the reactor, a control rod receivable in said control rod guide passageway and movable axially, for regulating purposes, along the guide passageway between a fully withdrawn position and a fully inserted position in relation to the guide passageway, said guide passageway having a recess formed therein, said control rod being formed with first abutment means for releasable mechanical engagement in said recess of said guide passageway when said control rod is in its fully inserted position and is in a given angular position with respect to said guide passageway for positively limiting movement of said control rod in a first direction towards its fully withdrawn position and a drive rod for bringing about axial movement of said control rod and rotation of said control rod about the vertical axis thereof, when said control rod is in its fully inserted position, between said given angular position and a different angular position in which said first abutment means do not engage in said recess so that movement of the control rod in said first direction is permitted, said control rod being formed at one end with coupling portions for releasable mechanical engagement with coupling portions of said drive rod so that when said control rod is in said fully inserted position, said drive rod is operatively engageable with said control rod, for moving said control rod in said first direction towards said fully withdrawn position thereof, by initially moving said drive rod in a second direction opposite to said first direction, while it is in a first angular position, different from said given angular position, with respect to the axis of the control rod, so as to bring the coupling portions of said drive rod up to and beyond those of the control rod, then rotating said drive rod about the axis of said control rod to a second angular position in relation thereto and then withdrawing said drive rod in said first direction, release of the engagement being effected conversely, said control rod being formed at said one end with second abutment means immediately below said coupling portions for engagement with said coupling portions on said drive rod when said control rod is in its fully inserted position, said first abutment means being out of engagement with said recess during axial movement of said control rod by said drive rod, means for rotating said drive rod to cause said coupling portions on said drive rod to engage said second abutment means on said control rod when in the fully inserted position and axially rotate said control rod between said given angular position wherein said first abutment means does not engage said recess and said different angular position wherein said first abutment means engage said recess to maintain said control rod in its fully inserted position.

* * * * *